United States Patent
Dev et al.

(10) Patent No.: US 10,955,858 B2
(45) Date of Patent: Mar. 23, 2021

(54) METHOD OF GENERATING A SURROUND VIEW OF A VEHICLE PLATOON AND A DEVICE THEREOF

(71) Applicant: Wipro Limited, Bangalore (IN)

(72) Inventors: Yuvika Dev, Bangalore (IN); Vinod Pathangay, Bangalore (IN)

(73) Assignee: Wipro Limited, Bangalore (IN)

( * ) Notice: Subject to any disclaimer, the term of this patent is extended or adjusted under 35 U.S.C. 154(b) by 233 days.

(21) Appl. No.: 16/276,678

(22) Filed: Feb. 15, 2019

(65) Prior Publication Data

US 2020/0209889 A1      Jul. 2, 2020

(30) Foreign Application Priority Data

Dec. 27, 2018   (IN) .............................. 201841049402

(51) Int. Cl.
| | |
|---|---|
| *G05D 1/02* | (2020.01) |
| *G08G 1/00* | (2006.01) |
| *G05D 1/00* | (2006.01) |
| *B60R 1/00* | (2006.01) |
| *G08G 1/16* | (2006.01) |

(52) U.S. Cl.
CPC ............. *G05D 1/0295* (2013.01); *B60R 1/00* (2013.01); *G05D 1/0094* (2013.01); *G05D 1/0293* (2013.01); *G08G 1/161* (2013.01); *G08G 1/22* (2013.01); *B60R 2300/102* (2013.01); *B60R 2300/105* (2013.01)

(58) Field of Classification Search
CPC .. G05D 1/0295; G05D 1/0094; G05D 1/0293; B60R 1/00; B60R 2300/102; B60R 2300/105; G08G 1/161; G08G 1/22

USPC ............................................................ 701/23
See application file for complete search history.

(56) References Cited

U.S. PATENT DOCUMENTS

| | | | |
|---|---|---|---|
| 6,032,097 A | 2/2000 | Iihoshi et al. | |
| 6,128,559 A | 10/2000 | Saitou et al. | |
| 8,352,111 B2 | 1/2013 | Mudalige | |
| 9,396,661 B2 | 7/2016 | Okamoto | |

(Continued)

FOREIGN PATENT DOCUMENTS

| | | | |
|---|---|---|---|
| CN | 105882528 A | 8/2016 | |
| JP | 10293899 A | 11/1998 | |

(Continued)

*Primary Examiner* — Gertrude Arthur Jeanglaude
(74) *Attorney, Agent, or Firm* — Finnegan, Henderson, Farabow, Garrett & Dunner, LLP

(57) ABSTRACT

The present disclosure relates to a method of generating a surround view of a vehicle platoon and a device thereof. A surround view generating device for a vehicle in the vehicle platoon acquires a local surround view of the vehicle and at least one of a truncated local surround view associated with one or more preceding vehicles and a truncated local surround view associated with one or more following vehicles in the vehicle platoon. Further, the surround view generation device generates a surround view of the vehicle platoon using the local surround view of the vehicle, the truncated local surround view associated with the one or more preceding vehicles, and the truncated local surround view associated with the one or more following vehicles. Finally, the surround view generating device navigates the vehicle in the vehicle platoon based on the surround view of the vehicle platoon.

19 Claims, 8 Drawing Sheets

(56) References Cited

U.S. PATENT DOCUMENTS

| | | | |
|---|---|---|---|
| 9,632,507 B1 * | 4/2017 | Korn | G08G 1/22 |
| 9,858,817 B1 | 1/2018 | Bletzer et al. | |
| 2002/0149476 A1 * | 10/2002 | Ogura | H04N 7/18 |
| | | | 340/436 |
| 2014/0316671 A1 | 10/2014 | Okamoto | |
| 2016/0026187 A1 | 1/2016 | Alam et al. | |
| 2017/0158133 A1 | 6/2017 | Chundrlik, Jr. et al. | |

FOREIGN PATENT DOCUMENTS

| | | |
|---|---|---|
| JP | 2001001791 A | 1/2001 |
| JP | 2001222790 A | 8/2001 |

\* cited by examiner

| S. No. | Vehicle Position | Virtual IP -1 (To connect with Preceding vehicle) | Virtual IP - 2 (To connect with Following vehicle) |
|---|---|---|---|
| 1 | V1 | V_IP_11 (N.A.) | V_IP_12 Used by V2 for requesting truncated local surround view of V1 |
| 2 | V2 | V_IP_21 Used by V1 for requesting truncated local surround view of V2+V3+V4+V5 | V_IP_22 Used by V3 for requesting truncated local surround view of V1+V2 |
| 3 | V3 | V_IP_31 Used by V2 for requesting truncated local surround view of V3+V4+V5 | V_IP_32 Used by V4 for requesting truncated local surround view of V1+V2+V3 |
| 4 | V4 | V_IP_41 Used by V3 for requesting truncated local surround view of V4+V5 | V_IP_42 Used by V5 for requesting truncated local surround view of V1+V2+V3+V4 |
| 5 | V5 | V_IP_51 Used by V4 for requesting truncated local surround view of V5 | V_IP_52 (N.A.) |

FIG. 6

METHOD OF GENERATING A SURROUND VIEW OF A VEHICLE PLATOON AND A DEVICE THEREOF

TECHNICAL FIELD

The present disclosure in general relates to vehicle platooning. More particularly, the present disclosure relates to a method of generating a surround view of a vehicle platoon and a device thereof.

BACKGROUND

Vehicle platooning is a technique which allows two or more vehicles travelling along in a highway to run together in form of a road-train by maintaining a steady speed for long distances. A main idea behind the vehicle platooning is to increase road capacity by having one vehicle following another vehicle with minimum inter-vehicular distance so as to avoid air drag and increase fuel efficiency. This is more advantageous in case of autonomous vehicles which can communicate with other vehicles using vehicle-to-vehicle (V2V) communication and vehicle-to-infrastructure (V2I) communication. However, it is also important for the vehicles participating in the vehicle platooning to maintain the minimum inter-vehicular distance between two vehicles keeping in account type of vehicle and speed to run smoothly and safely.

The vehicle platooning involves cooperation and planning between companies and fleet owners to enable the vehicles to communicate with each other while booking, joining and leaving a vehicle platoon. Vehicle platooning includes further consideration of safety parameters, specific to road, weather, traffic and vehicle conditions. In most of the cases the vehicle platoon is managed by a cloud-based network operations centre that continuously connects with the vehicles through cellular and wireless networks.

In the vehicle platoon, a lead vehicle navigates other non-lead vehicles travelling behind it. Since the non-lead vehicle cannot have a view in front of a preceding vehicle, the lead vehicle takes decisions for the vehicle platoon. The lead vehicle transmits steering directions and braking signals to the non-lead vehicles. Thus, the non-lead vehicles are not capable of taking independent decisions in emergency situations, for instance sudden obstructions. For example, if a vehicle in front of the vehicle platoon is taking a turn and the lead vehicle does not have time to stop or to give proper directions to the non-lead vehicles in the vehicle platoon, this can cause a collision in the vehicle platoon. Also, there are multiple blind-spots for the lead vehicle which need to be addressed to avoid accidents.

SUMMARY

In one embodiment, the present disclosure relates to a method of generating a surround view of a vehicle platoon. The method includes acquiring a local surround view of a vehicle in the vehicle platoon. The local surround view includes a front camera view, a rear camera view, a left camera view, and a right camera view captured for one or more vehicles in the vehicle platoon. The method further includes receiving at least one of a truncated local surround view associated with one or more preceding vehicles in the vehicle platoon and a truncated local surround view associated with one or more following vehicles in the vehicle platoon. The truncated local surround view associated with the one or more preceding vehicles in the vehicle platoon includes the front camera view, the left camera view and the right camera view associated with each of the one or more preceding vehicles. The truncated local surround view associated with the one or more following vehicles in the vehicle platoon includes the rear camera view, the left camera view and the right camera view associated with each of the one or more following vehicles. The method further includes generating the surround view of the vehicle platoon using the local surround view of the vehicle, the truncated local surround view associated with the one or more preceding vehicles, and the truncated local surround view associated with the one or more following vehicles. The surround view of the platoon is then used for navigating the vehicle in the vehicle platoon.

In another embodiment, the present disclosure relates to a surround view generation device for a vehicle platoon. The surround view generation device includes a processor and a memory. The processor is configured to acquire a local surround view of a vehicle in the vehicle platoon, wherein the local surround view includes a front camera view, a rear camera view, a left camera view, and a right camera view. The processor is further configured to receive at least one of a truncated local surround view associated with one or more preceding vehicles in the vehicle platoon and a truncated local surround view associated with one or more following vehicles in the vehicle platoon. The truncated local surround view associate with the one or more preceding vehicles in the vehicle platoon includes the front camera view, the left camera view and the right camera view associated with each of the one or more preceding vehicles. The truncated local surround view associated with the one or more following vehicles includes the rear camera view, the left camera view and the right camera view associated with each of the one or more following vehicles. The processor is further configured to generate the surround view of the vehicle platoon using the local surround view of the vehicle, the truncated local surround view associated with the one or more preceding vehicles, and the truncated local surround view associated with the one or more following vehicles. Thereafter the processor is configured to navigate the vehicle based on the surround view of the vehicle platoon.

In an embodiment, the present disclosure relates to a non-transitory computer readable medium including instructions stored thereon that when processed by at least one processor cause a surround view generation device to acquire a local surround view of a vehicle in the vehicle platoon. The local surround view includes a front camera view, a rear camera view, a left camera view, and a right camera view captured for one or more vehicles in the vehicle platoon. The processor is further configured to receive at least one of a truncated local surround view associated with one or more preceding vehicles in the vehicle platoon and a truncated local surround view associated with one or more following vehicles in the vehicle platoon. The truncated local surround view associate with the one or more preceding vehicles in the vehicle platoon includes the front camera view, the left camera view and the right camera view associated with each of the one or more preceding vehicles. The truncated local surround view associated with the one or more following vehicles includes the rear camera view, the left camera view and the right camera view associated with each of the one or more following vehicles. The processor is further configured to generate the surround view of the vehicle platoon using the local surround view of the vehicle, the truncated local surround view associated with the one or more preceding vehicles, and the truncated local surround view associated with the one or more following vehicles.

Thereafter the processor is configured to navigate the vehicle based on the surround view of the vehicle platoon.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

One or more embodiments are now described, by way of example only, with reference to the accompanying figures wherein like reference numerals represent like elements and in which:

FIG. 6 illustrates a mapping table generated by a lead vehicle in a vehicle platoon, in accordance with embodiments of the present invention.

DETAILED DESCRIPTION

Figure 1:
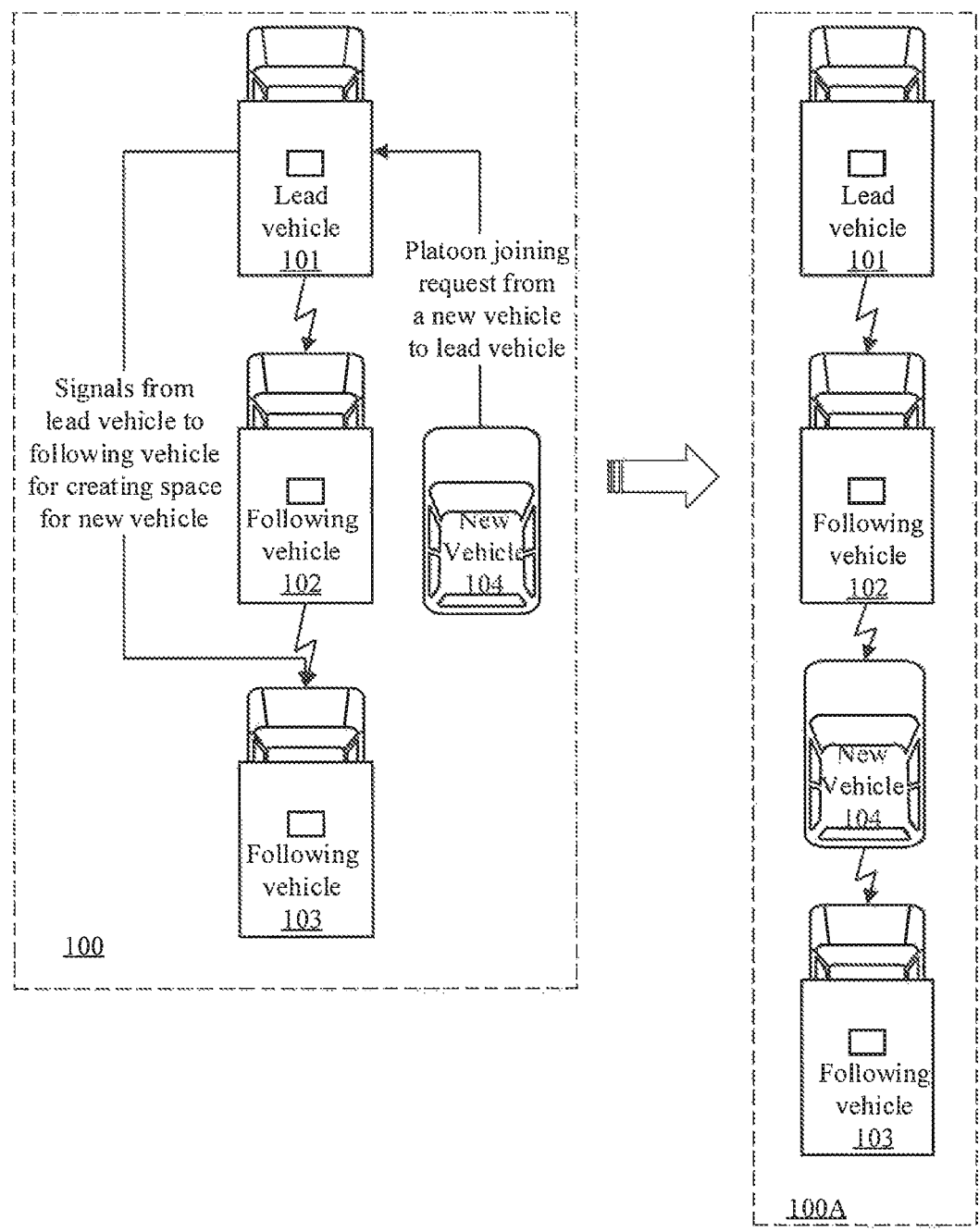
FIG. 1 illustrates a method of initialization and joining of a vehicle platoon, in accordance with embodiments of the present disclosure.

The novel features and characteristic of the present disclosure are set forth in the appended claims. The present disclosure itself, however, as well as a preferred mode of use, further objectives and advantages thereof, will best be understood by reference to the following detailed description of an illustrative embodiment when read in conjunction with the accompanying figures. While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The embodiments of the present disclosure relate to a surround view generation device and a method of generating a surround view of a vehicle platoon. In an embodiment, the system including a surround view generation device is associated with each vehicle in the vehicle platoon. The surround view generation device is configured to communicate with one or more vehicles traveling in the vehicle platoon using a wireless interface. Thus the surround view generation device connects the vehicle with other vehicles in the vehicle platoon to enable the vehicles to generate the surround view of the vehicle platoon. The surround view generation device enables the vehicle to navigate based on the surround view of the vehicle platoon. In an embodiment, the surround view generations device enables the vehicle to detect one or more obstacles using the surround view of the vehicle platoon. In another embodiment, the surround view generation device navigates the vehicle in the vehicle platoon to avoid the obstacles. The vehicle can be a lead vehicle or one or more non-lead vehicle in the vehicle platoon. The surround view generation device enables a vehicle in the vehicle platoon to take actions independently to avoid the obstacles.

The embodiments of the present disclosure relate to a method of generating a surround view of a vehicle platoon. The method includes acquiring a local surround view of the vehicle in the vehicle platoon, wherein the local surround view comprises a front camera view, a rear camera view, a left camera view, and a right camera view. The local surround view can be acquired by each of the vehicle in the vehicle platoon. The method further includes connecting the vehicle with other vehicles in the vehicle platoon for receiving at least one of a truncated local surround view associated with one or more preceding vehicles in the vehicle platoon and a truncated local surround view associated with one or more following vehicles in the vehicle platoon. The truncated local surround view associated with one or more preceding vehicles includes the front and side view of the one or more preceding vehicle that cannot be seen by the vehicle in the vehicle platoon. The truncated local surround view associated with one or more following vehicles includes the side and rear view of the one or more following vehicle that provide background scene of following vehicles to the vehicle in the vehicle platoon. The method includes generating a surround view of the vehicle platoon by the vehicle using the local surround view of the vehicle, the truncated local surround view associated with the one or more preceding vehicles, and the truncated local surround view associated with the one or more following vehicles. The surround view of the vehicle can be generated at each of the vehicle in the vehicle platoon. In some cases, the surround view of the vehicle platoon generated at one vehicle can be shared with a cloud server to facilitate navigation. The method allows navigating the vehicle based on the surround view of the vehicle. The method further includes sending steering directions and braking signals to the vehicle while navigating to allow the vehicle to take independent actions in case of emergency situation.

FIG. 1 illustrates a method of initialization and joining of a vehicle platoon, in accordance with embodiments of the present disclosure. The method proposed in the present disclosure and the device thereof is implemented once a vehicle platoon is formed out of one or more vehicles traveling together on a road. The formation of the vehicle platoon includes initialization and joining of the vehicle platoon. As illustrated in FIG. 1, a vehicle platoon 100 includes a lead vehicle 101, which leads the vehicle platoon 100. The vehicle platoon 100 also includes one or more following vehicles, for example a following vehicle 102 and a following vehicle 103, which are controlled by the lead vehicle 101. The lead vehicle 101 can be manually driven by a driver or it can be driven on automated mode. The following vehicles are longitudinally automated to maintain a close trailing with preceding vehicle and connectivity with the lead vehicle 101.

FIG. 1, in particular, illustrates joining of the vehicle platoon 100 by a new vehicle 104. As shown in FIG. 1, a platoon joining request is sent to the lead vehicle 101 from the new vehicle 104 requesting for joining the vehicle platoon 100. The new vehicle 104 can request for joining the vehicle platoon at a position of any following vehicle near to its current location, for instance it can be either at position 3 or at the end of the vehicle platoon. A Cooperative Adaptive Cruise Control (CACC) system of the new vehicle 104 communicates with the lead vehicle 101 using a wireless network. On receiving the platoon joining request, the lead vehicle 101 will check whether the vehicle platoon 100 has reached a maximum length or whether any other vehicle in the vehicle platoon 100 is planning to leave and then sends an approval to the new vehicle 104. After sending the approval, the lead vehicle 101 creates space for the new vehicle 104 at the position 3 based on the platoon joining request, by sending instructions to the following vehicle 103 which is currently at position 3 of the vehicle platoon 100. Accordingly, speed and position of the following vehicle 103 is controlled by the lead vehicle 101. Once approval is received from the lead vehicle 101, the new vehicle 104 enabled by the CACC system changes lane and becomes part of a newly formed vehicle platoon 100A.

Once the vehicle platoon 100 is formed, the lead vehicle 101 is responsible for obtaining the connecting details of each of the following vehicles 102 and 103 in the vehicle platoon 100. In an embodiment, the lead vehicle 101 will obtain the IP addresses of sensors installed at the following vehicles 102 and 103. The lead vehicle 101 will obtain the connecting details of each of the following vehicles 102 and 103 in the vehicle platoon for receiving and forwarding data from one another. The lead vehicle 101 will store the obtained connecting details in a mapping table. The mapping table is shared with each of the following vehicles 102 and 103 in the vehicle platoon to allow the vehicles to connect with one another.

Whenever the new vehicle 104 joins the vehicle platoon 100, the lead vehicle 101 will obtain the connecting details, update its mapping table and share the updated mapping table with each of the following vehicles 102, 103, and 104 in the vehicle platoon. If any vehicle leaves the vehicle platoon 100, the lead vehicle 101 updates its mapping table by removing the entry of that vehicle and shares the updated table with each of the remaining following vehicles in the vehicle platoon 100.

When any vehicle in the vehicle platoon 100 plans to leave the vehicle platoon 100, it sends a leaving request to the lead vehicle 101 and waits for a leave authorization. Upon receipt of the leave authorization, the vehicle increases its space from its preceding vehicle. When maximum spacing has been achieved, the vehicle switches its speed controller to manual and changes its lane. The vehicle leaving the vehicle platoon 100 sends an acknowledgement to the lead vehicle 101.

While forming the vehicle platoon 100, various vehicles travelling along having similar characteristics in terms of speed capacity, acceleration capabilities, similar network connectivity, and the like, can join together. In addition to above characteristics, it is necessary for the vehicles joining the vehicle platoon 100 to have image capturing devices such as camera systems mounted on the vehicles. The camera systems mounted on a vehicle are configured to capture surroundings of the vehicle which become a part of local surround view. Vehicle platooning further requires the vehicles to have automation features that include, but are not limited to, Adaptive Cruise Control system (ACC system), Advanced Driver Assistance Systems (ADAS), LIDAR sensors, RADAR systems, road sensors, speed sensors, and acceleration sensors. The vehicles having similar destinations and paths are more preferred to be included in the vehicle platoon 100.

Figure 2:
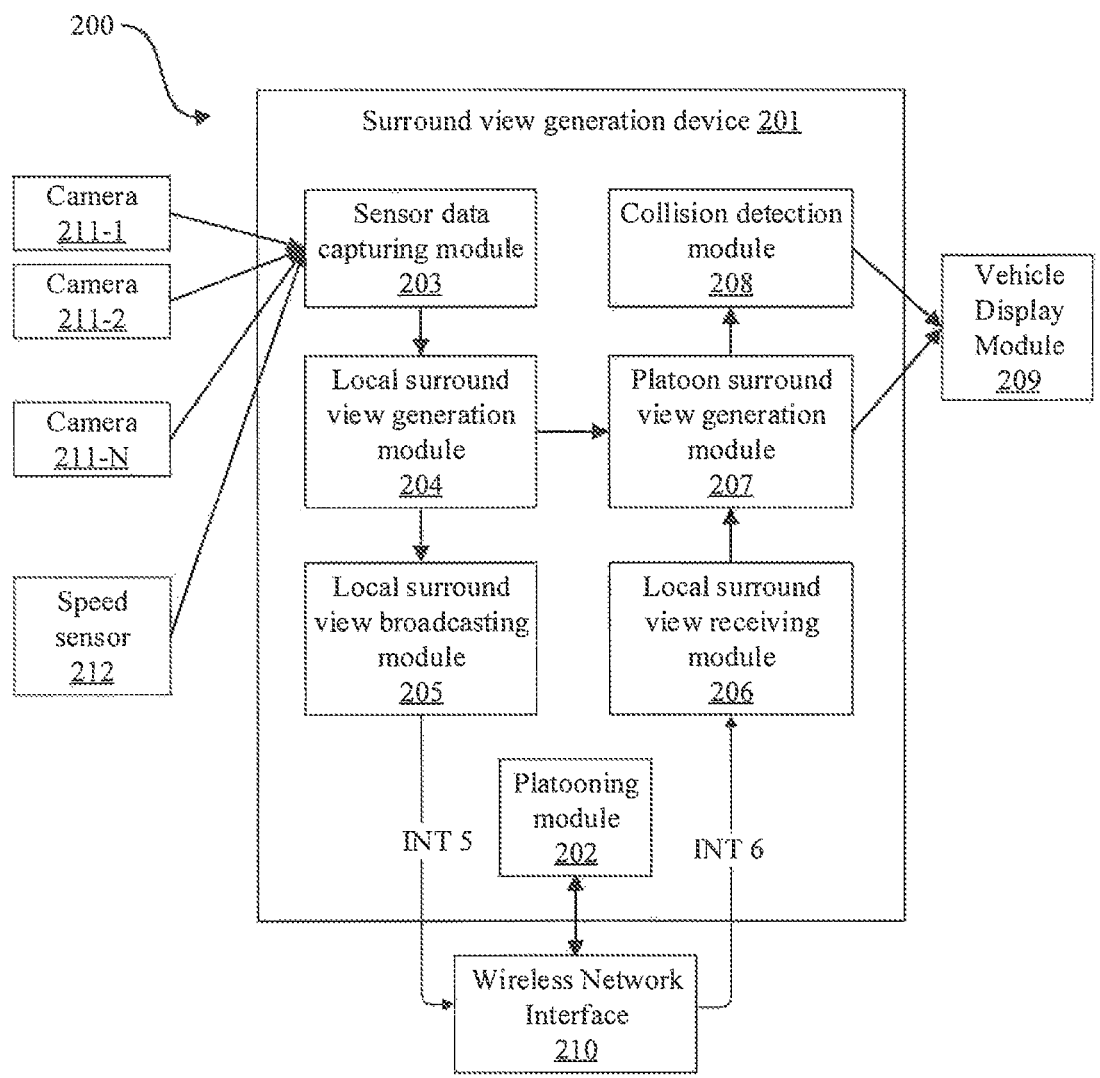
FIG. 2 illustrates a block diagram of system in a vehicle in a vehicle platoon including a surround view generation device, in accordance with embodiments of the present disclosure.

FIG. 2 illustrates a block diagram of system 200 in a vehicle in a vehicle platoon including a surround view generation device, in accordance with embodiments of the present disclosure. As illustrated, the surround view generation device 201 is configured to generate the surround view of the vehicle platoon 100. The surround view generation device 201 includes a platooning module 202, a sensor data capturing module 203, a local surround view generation module 204, a local surround view broadcasting module 205, a local surround view receiving module 206, a platoon surround view generation module 207 and a collision detection module 208. The surround view generation device 201 connects with a vehicle display module 209 of the vehicle for providing navigation to the vehicle. The surround view generation device 201 also connects with one or more camera systems 211-1, 211-2, ... 211-N and speed sensors 212 associated with the vehicle for acquiring sensor data.

The platooning module 202 in the vehicle is configured to connect with other vehicles via a wireless interface INT 9 for initializing and coordinating the vehicle platoon 100. The platooning module 202 of the lead vehicle 101 communicates with the platooning module of other following vehicles 102 and 103 in the vehicle platoon 100 to coordinate the scenarios of joining and leaving of the vehicle platoon as explained in FIG. 1.

The camera systems 211-1, 211-2, ... 211-N mounted on the vehicle in the vehicle platoon 100 is configured to capture video frames of the surroundings of the vehicle at a pre-defined rate or a requested rate. The speed sensor 212 is configured to capture speed of the vehicle. As required by the surround view generation device 201, the sensor data capturing module 203 is connected with the camera systems via dedicated interfaces INT 1, INT 2, INT3 to acquire a local surround view of the vehicle. The sensor data capturing module 203 is configured to acquire the video frames associated with the local surround view of the vehicle. The local surround view of the vehicle includes a front camera view, a rear camera view, a left camera view, and a right camera view. The sensor data capturing module 203 is further configured to acquire the speed of the vehicle from the speed sensor 212 associated with the vehicle using dedicated interface INT 4.

The local surround view generation module 204 obtains the video frames from the sensor data capturing module 203 to generate the local surround view of the vehicle. The local surround view can be generated by using exemplary method of creating a surround view for a vehicle which will be explained later with reference to FIG. 4.

The system 200 including the surround view generation device 201 is further configured to connect with other vehicles in the vehicle platoon via the local surround view receiving module 206 using a wireless interface INT 6 to receive data related to the surrounding of all other vehicles in the vehicle platoon 100. The local surround view receiving module 206 in the surround view generation device 201 is configured to receive at least one of a truncated local surround view associated with one or more preceding vehicles in the vehicle platoon 100 and a truncated local surround view associated with one or more following vehicles in the vehicle platoon 100. The camera views captured by the camera systems installed on the vehicles in the vehicle platoon will be explained with reference to FIG. 5.

Figure 5:
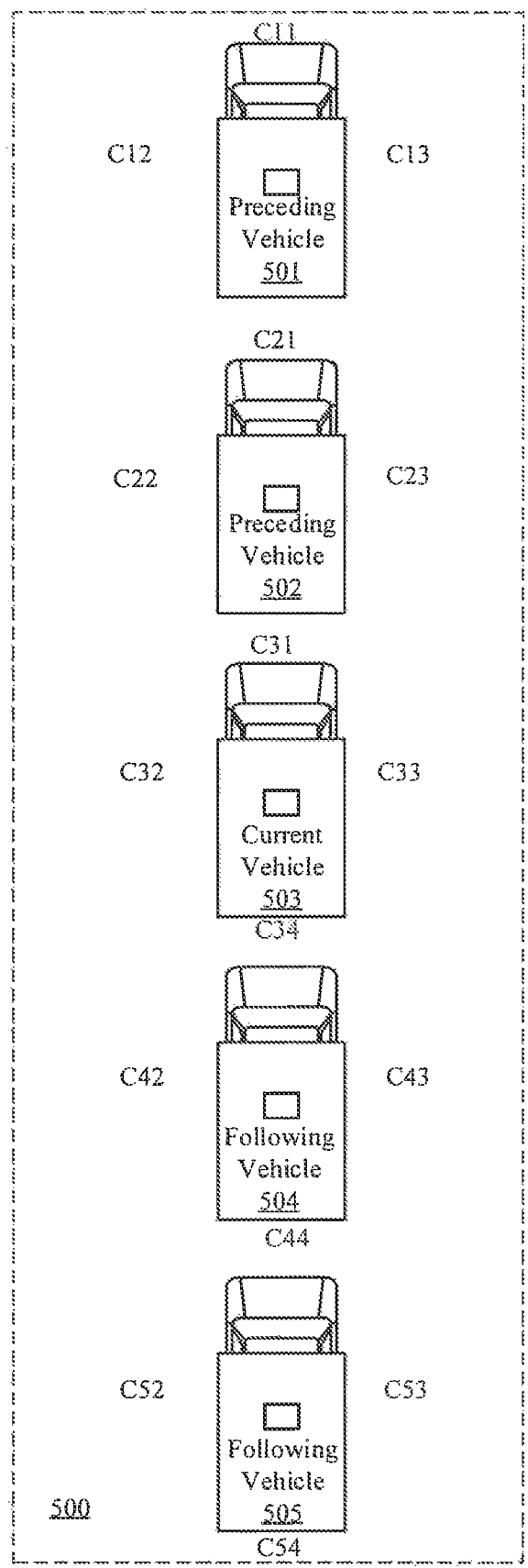
FIG. 5 illustrates an overview of a vehicle platoon, one or more camera systems mounted on vehicles, and one or more camera views associated with the vehicles in the vehicle platoon, in accordance with embodiments of the present disclosure.

As illustrated in FIG. 5, the local surround view receiving module in the surround view generation device of current vehicle 503 in the vehicle platoon 500 is configured to receive at least one of a truncated local surround view associated with one or more preceding vehicles 501, 502 and a truncated local surround view associated with one or more following vehicles 504, 505 in the vehicle platoon.

The system 200 including the surround view generation device 201 is further configured to connect with other vehicles in the vehicle platoon via the local surround view broadcasting module 205 using a wireless interface INT 5 to broadcast the local surround view of the vehicle to other vehicles. As illustrated in FIG. 5, the local surround view broadcasting module 205 in the surround view generation device 201 of a current vehicle 503 in the vehicle platoon 500 is also configured to forward the truncated local surround view received from one or more preceding vehicles 501, 502 to one or more forwarding vehicles 504, 505. The local surround view broadcasting module 205 in the current vehicle 503 is also configured to forward the truncated local surround view received from one or more following vehicles 504, 505 to one or more preceding vehicles 501, 502. The local surround view broadcasting module 205 is further configured to selectively broadcast the local surround view of the current vehicle 503 to other vehicles in the vehicle platoon 500. In an embodiment, the local surround view broadcasting module 205, while forwarding the local surround view of the current vehicle 503 to one or more preceding vehicles 501, 502, will broadcast only the video frames associated with the rear camera view, the left camera view and the right camera view of the one or more following vehicles 504, 505. Similarly, the local surround view broadcasting module 205, while forwarding the local surround view of current vehicle 503 to one or more following vehicles 504, 505, will broadcast only the video frames associated with the front camera view, the left camera view and the right camera view of the one or more preceding vehicles 501, 502.

The platoon surround view generation module 207 is configured to generate the surround view of the vehicle platoon. The surround view of the vehicle platoon is generated at each of the vehicles in the vehicle platoon using the local surround view of the vehicle 503, the truncated local surround view associated with one or more preceding vehicles 501, 502, and the truncated local surround view associated with one or more following vehicles 504, 505. The platoon surround view generation module 207 generates the surround view of the vehicle platoon by stitching the local surround view of the vehicle 503, the truncated local surround view associated with one or more preceding vehicles 501, 502 and the truncated local surround view associated with one or more following vehicles 504, 505. The surround view of the vehicle platoon is generated at each of the vehicle in the vehicle platoon 500 by stitching together the video frames associated with the local surround view of the current vehicle 503 and the truncated local surround view received from other vehicles in the vehicle platoon 500. In an embodiment, the surround view of the vehicle platoon can be generated at one or more vehicles and then can be broadcasted to other vehicles in the vehicle platoon.

The surround view generation device 201 is connected with the vehicle display module 209 of the vehicle through the platoon surround view generation module 207 to display the live streaming video frames associated with the surround view of the vehicle platoon 100. The vehicle display module 209 provides a simulated view of the vehicle platoon and its surroundings to each vehicle in the vehicle platoon. The simulated view, described in detail with reference to FIG. 6, enables each of the following vehicles in the vehicle platoon 100 to take necessary actions in case of emergency situations.

The surround view generation device 201 includes the collision detection module 208, which is provided with the surround view of the vehicle platoon to detect one or more obstacles. The collision detection module 208 is also provided with the speed data of the vehicle along with the surround view of the vehicle platoon to predict the possibility of a collision in or around the vehicle platoon 100 using the vehicle trajectories estimates of vehicles in the vehicle platoon 100. The collision detection module 208 uses a pre-train object detector optimized for detecting one or more objects such as vehicles, pedestrians and the like. The collision detection module 208 detects nearby vehicles that are not a part of the vehicle platoon 100, hereinafter referred as nonplatooning vehicles, in the surround view of the vehicle platoon. These objects as well as the non-platooning vehicles have a probability of causing collision within the vehicle platoon and thus considered as obstacles.

The collision detection module 208 is further configured to provide alerts or commands to the vehicle to avoid the obstacles. The alerts generated by the collision detection module 208 can be a text message or an audio message or a combination of both, provided on the vehicle display module 209. The commands generated by the collision detection module 208 includes one or more actions to be taken by the vehicle to avoid the obstacles. In an embodiment, the collision detection module 208 includes an alerting module In an embodiment, the commands generated by the surround view generated device 201 may include actions that can be given priority over the regular steering directions and braking signals provided by the lead vehicle to the one or more following vehicles in the vehicle platoon.

In an embodiment, the collision detection module includes an alerting module (not shown in FIG. 2) which is configured to generate alerts for the vehicle in the vehicle platoon 100. In some embodiments, the collision detection module 208, either alone or in combination with the alerting module, uses a 2-seconds rule as minimum safe distance, for every vehicle, calculated based on the speed of the vehicle. The safe distance is calculated based on the time which the vehicle will come to stop after applying brakes. The safe distance further depends on one or more factors including vehicle-type and weather-condition. The vehicles travelling in the vehicle platoon maintain an inter-vehicular distance which can be equal or more than the safe distance.

For each vehicle in the vehicle platoon, three different zones are defined based on safe distance and are explained in detail below.

Zone 1 or Critical Zone has Priority 1: The zone 1 is calculated based on the safe distance and may be highlighted, for example in red color. Herein the distance changes by adding extra seconds on top of the safe distance i.e., 2 seconds as explained in below embodiments.

Zone 2 or Warning Zone has Priority 2: Calculated based on distance between vehicles in platoon, area starting after critical zone and up to half of the inter-vehicular distance within platoon will be considered as warning zone. This may be highlighted in orange color.

Zone 3 or Safe Zone has Priority 3: Anything beyond warning zone of a vehicle, is considered as safe zone for current vehicle. This may be highlighted in green color.

If vehicle length=normal, then there is no change. In case of a large vehicle, the safe distance is added with 2 seconds. In case of Heavy-Truck, the safe distance is added with 3 seconds.

In an embodiment, the system also considers weather conditions. There is no change in case of normal weather conditions. However, the system further considers any change in weather conditions such as rain, ice, or fog, in which case the safe distance is added with 1 second. The safe distance can be further added with 5 seconds in case of extreme weather conditions.

In another embodiment, the collision detection module is also aware of trajectory path of other non-platooning vehicles for predicting collision.

In an embodiment, the alerts or commands are generated by the collision detection module 208, either alone or in combination with the alerting module, based on zone priority of the obstacles for the current vehicle. In another embodiment, the alerts or commands are generated by the collision detection module 208 based on zone priority of the obstacles for any other vehicle in the vehicle platoon 100.

The vehicle display module 209 is configured to provide a simulated view of the vehicle platoon to each of the vehicle in the vehicle platoon. The simulated view includes the vehicles in the vehicle platoon and the obstacles detected by the collision detection module 208. The alerts generated by the collision detection module 208, either alone or in combination with the alerting module, for one or more vehicles in the vehicle platoon are also highlighted on the top of the simulated view as explained in FIG. 6. The vehicle display module 209 is further configured to display the obstacles along with the collision probability of the one or more obstacles with the current vehicle.

Figure 3:
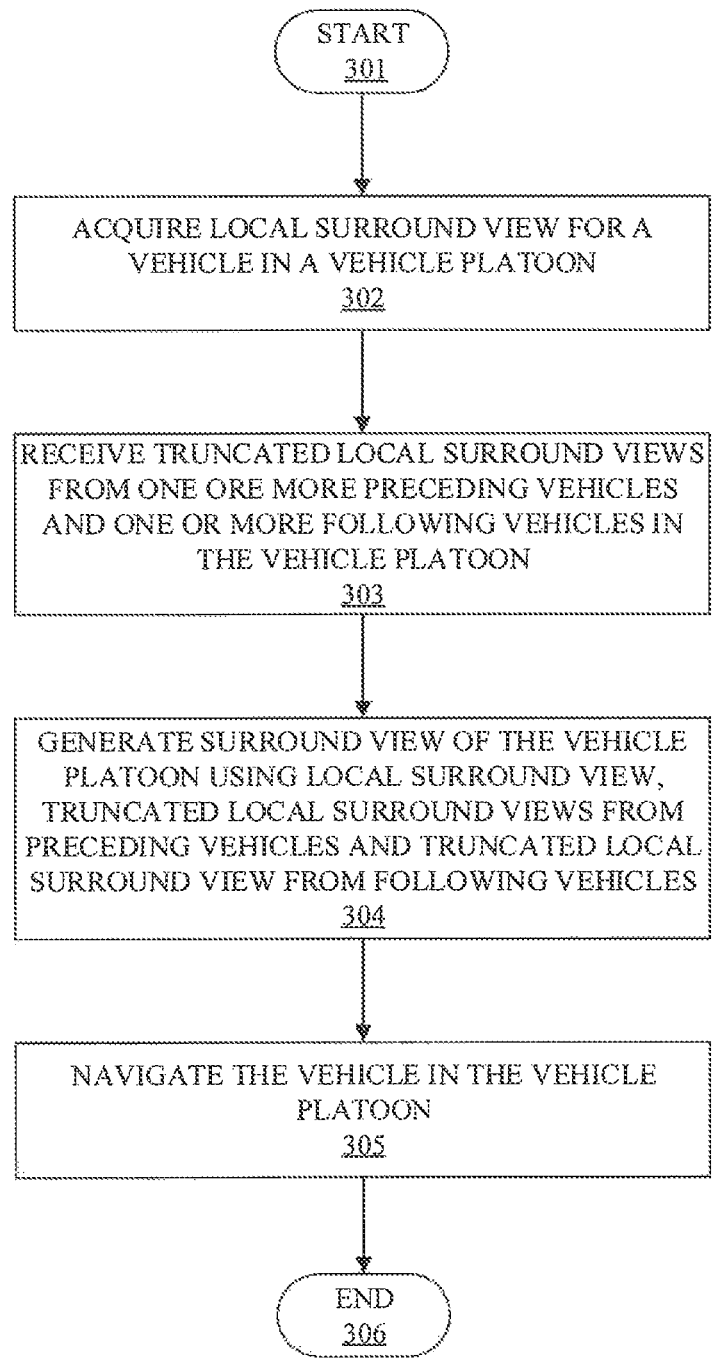
FIG. 3 is a method flow diagram for generating a surround view for a vehicle platoon in accordance with embodiments of the present disclosure.

FIG. 3 is a method flow diagram for generating a surround view for a vehicle platoon in accordance with embodiments of the present disclosure. The method starts at step 301. The method at step 302 includes acquiring, by the surround view generation device 201 associated with a vehicle in the vehicle platoon, for example the vehicle platoon 100 of FIG. 1, a local surround view of the vehicle travelling in a vehicle platoon. In a preferred embodiment, the vehicles travelling in a vehicle platoon are configured to capture the local surround view of the vehicle using the camera systems mounted on the vehicle. The local surround view includes a front camera view, a rear camera view, a left camera view and a right camera view. The local surround view includes video frames of surroundings of the vehicle captured using camera systems mounted on the vehicle. In an embodiment, the camera systems can have a 360-degree viewing range to capture the local surround view.

In another embodiment, the method 300 includes acquiring video frames from one or more camera systems installed on available road-based infrastructure. Thus, the local surround view can also be acquired through road-based infrastructure such as lamp-posts, traffic signals or other similar components of intelligent transportation systems. In such case, the camera systems installed on the road-based infrastructure are configured with Global Positioning System (GPS). Therefore, the surround view generation device of the vehicle is aware of location of the one or more camera systems that are GPS tagged. The vehicles in the vehicle platoon are, therefore, configured to communicate directly with the one or more camera systems using the on-board GPS sensor.

Figure 4:
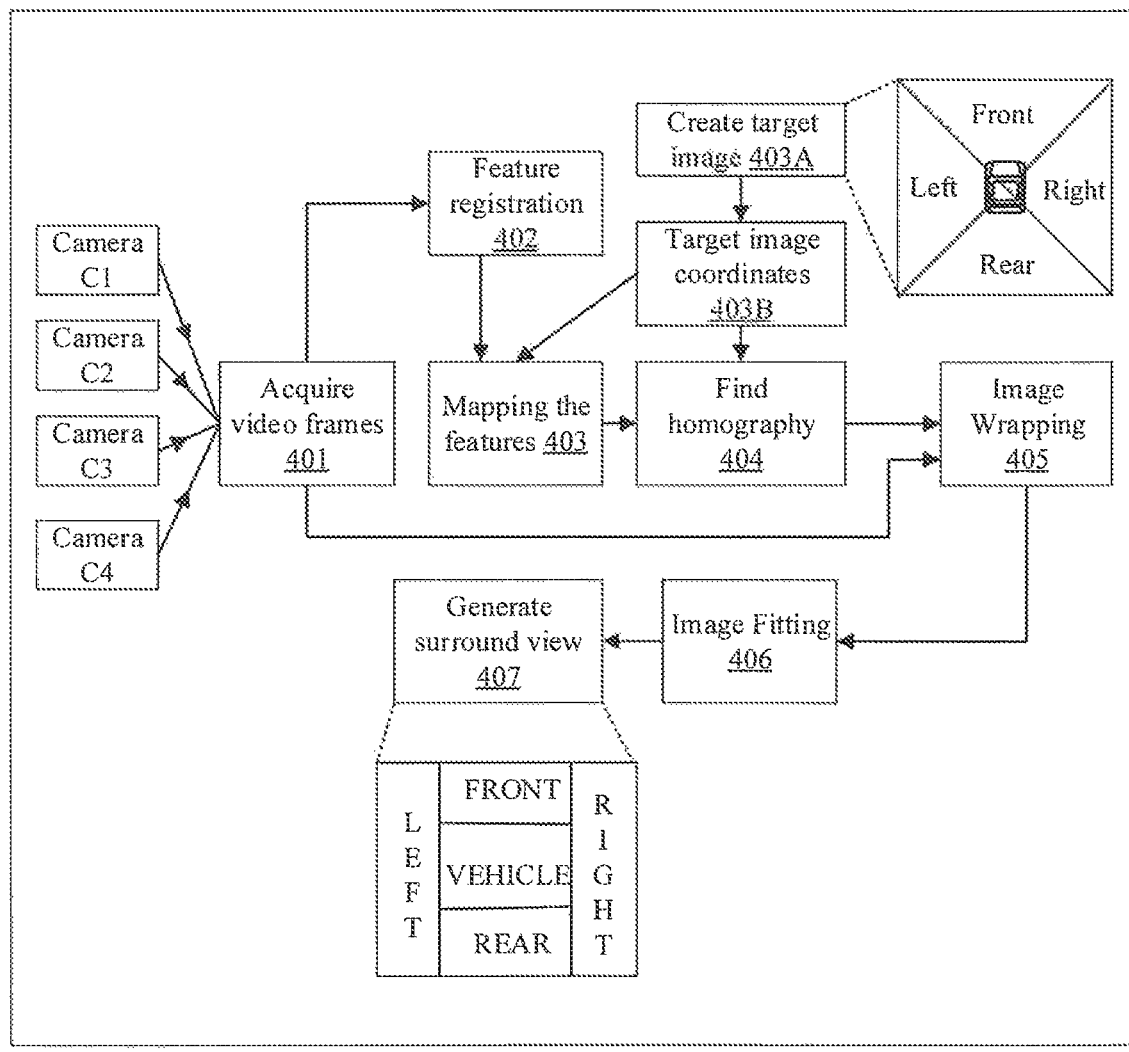
FIG. 4 illustrates an exemplary method for creating a surround view for a vehicle, in accordance with some embodiments of the present disclosure.

FIG. 4 illustrates an exemplary method for creating a surround view for a vehicle, in accordance with some embodiments of the present disclosure. In an embodiment, the exemplary method for creating a surround view can be used by the local surround view generation module 204 while creating a local surround view of a vehicle. As illustrated in FIG. 4, the local surround view generation module 204, upon acquiring the video frames at step 401 associated with the front camera view, the rear camera view, the left camera view and the right camera view from cameras C1, C2, C3 and C4, stitches the video frames using a pre-calibrated homograph mapping. The homograph mapping includes mapping the features of the surroundings of the vehicle at step 403 to create a panoramic local surround view of vehicle. In an embodiment, the homograph mapping includes 4 matrices to create the target image at step 403A wherein each matrix is associated with one out of the front camera view, the rear camera view, the left camera view, and the right camera view. The image generated using homograph mapping is further stitched using image wrapping at step 405 and image fitting at step 406 to create the local surround view of the vehicle.

As illustrated in FIG. 3, the method at step 303 further includes receiving at the vehicle the data related to the surrounding of other vehicles in the vehicle platoon 100. The surround view generation device 201 associated with the vehicle receives at least one of the truncated local surround view associated with one or more preceding vehicles in the vehicle platoon and the truncated local surround view associated with one or more following vehicles in the vehicle platoon. The truncated local surround view associated with one or more preceding vehicles in the vehicle platoon includes the front camera view, the left camera view and the right camera view associated with each of the one or more preceding vehicles. The truncated local surround view associated with the one or more following vehicles includes the rear camera view, the left camera view and the right camera view associated with each of the one or more following vehicles.

FIG. 5 illustrates an overview of a vehicle platoon, one or more camera systems mounted on vehicles, and one or more camera views associated with the vehicles in the vehicle platoon, in accordance with embodiments of the present disclosure. As illustrated, the one or more camera views covering the surrounding of the vehicles are captured by using one or more camera systems installed on the vehicles in the vehicle platoon 500. The surround view generation device 201 residing at each vehicle of the vehicle platoon 500 is configured to acquire the local surround view of the current vehicle 503 and the truncated local surround view from at least one or more preceding vehicles 501, 502 and one or more following vehicles 504, 505 in the vehicle platoon 500. The local surround view acquired for the current vehicle 503 includes the front camera view C31, the left camera view C32, the right camera view C33 and the rear camera view C34. For the current vehicle 503, the truncated local surround view associated with one or more preceding vehicles 501, 502 in the vehicle platoon includes the front camera view C11 and C21, the left camera view C12 and C22 and the right camera view C13 and C23. The truncated local surround view associated with the one or more following vehicles 504, 505 includes the rear camera view C44 and C54, the left camera view C42 and C52 and the right camera view C43 and C53.

In case of the lead vehicle 501 in the vehicle platoon 500, since there is no preceding vehicle to the lead vehicle 501, the lead vehicle 501 will only receive the truncated local surround view from one or more following vehicles 502, 503, 504, and 505. Similarly, the last following vehicle 505 in the vehicle platoon 500 will only receive the truncated local surround view from the one or more preceding vehicles 501, 502, 503, and 504.

The surround view generation device of one vehicle in the vehicle platoon is connected through the wireless network with the preceding vehicles and following vehicles in the vehicle platoon. The surround view generation device is, therefore, configured to obtain live streaming video frames from the immediately preceding vehicle and immediately following vehicle captured using the camera systems mounted on the immediately preceding vehicle and immediately following vehicle.

FIG. 6 illustrates a mapping table generated by a lead vehicle in a vehicle platoon, in accordance with embodiments of the present invention. The mapping table is shared by the lead vehicle to other vehicles in the vehicle platoon and is used by the vehicles to receive a plurality of video frames associated with the surrounding of other vehicles in the vehicle platoon. The current vehicle 503 will use the connecting details from the mapping table to receive at least one of the truncated local surround view associated with one or more preceding vehicles 501 and 502 and the truncated surround view associated with one or more following vehicles 504 and 505. As illustrated in FIG. 6, the mapping table includes IP addresses associated with the vehicle in the vehicle platoon. Every vehicle in the vehicle platoon can use one IP address to connect with preceding vehicles in the vehicle platoon. In an embodiment, the vehicle can use other IP addresses to connect with following vehicles in the vehicle platoon.

As illustrated in FIG. 6, the current vehicle 503 can use one virtual IP address of one or more preceding vehicles to request the truncated surround view of the preceding vehicles 501 and 502 in the vehicle platoon. Further, the current vehicle 503 can use another virtual IP address of one or more following vehicles to request the truncated surround view of the following vehicles 504 and 505 in the vehicle platoon. In an embodiment, if any vehicle in the vehicle platoon is unable to connect with immediately preceding or immediately following vehicle, it can connect with subsequent preceding vehicle or subsequent following vehicle to request the missing video frames.

In an embodiment, the current vehicle 503 is configured to forward the truncated local surround view received from one or more preceding vehicles 501 and 502 to one or more following vehicles 504 and 505. In another embodiment, the vehicle in the vehicle platoon is configured to forward the truncated local surround view received from one or more following vehicles 504 and 504 to one or more preceding vehicles 501 and 502.

The method at step 304 of FIG. 3 includes generating, by the surround view generation device 201 of the vehicle, the surround view of the vehicle platoon using the local surround view, the truncated local surround view associated with one or more preceding vehicles and the truncated local surround view associated with one or more following vehicles. In an embodiment, the surround view generation device 201 will collect the video frames associated with the local surround view captured from the one or more camera systems mounted on the current vehicle 503. Further, the surround view generation device will collect the video frames from one or more preceding vehicles 501, 502 captured using one or more selected camera systems covering the front and side view of the preceding vehicles. Furthermore, the surround view generation device will collect the video frames from one or more following vehicles 504, 505 captured using one or more selected camera systems covering the side and rear view of the following vehicles. The video frames collected by the surround view generation device are stitched together to generate the surround view of the vehicle platoon. The platoon surround view generation module 207 of the surround view generation device 201 can use the exemplary method of creating surround view explained in FIG. 4 to generate the surround view of the vehicle platoon.

The method at 305 of FIG. 3 includes navigating the vehicle in the vehicle platoon 500 using the surround view of the vehicle platoon generated by the surround view generation device 201. The surround view of the vehicle platoon is generated for every vehicle in the vehicle platoon 500 to enable the vehicles to have sight of the vehicle platoon and its surroundings. The surround view of the vehicle platoon will allow the vehicles travelling together to get rid of any blind-spots while being a part of vehicle platoon. The method further includes detecting one or more obstacles by the vehicles travelling in the vehicle platoon. The method further includes navigating the vehicle based on the obstacles. The method enables the following vehicles in the vehicle platoon to avoid obstacles by using the surround view of the vehicle platoon.

The method further includes acquiring speed data of the vehicle in the vehicle platoon 100. The surround view generating device 201 is configured to navigate the vehicle in the vehicle platoon 100 using the surround view of the platoon and speed data of the vehicle. The surround view generation device 201 is further configured to receive speed sensor data and acceleration data from the one or more preceding vehicles and one or more following vehicles. The method further enables each of the vehicles in the vehicle platoon to take actions independently to handle emergency situation. The sight of vehicle platoon surroundings and inter-vehicle view in the vehicle platoon allows the lead vehicle as well as the following vehicles to detect and avoid collision in emergency situation. The simulated view displayed on the vehicle display module is explained below.

Figure 7:
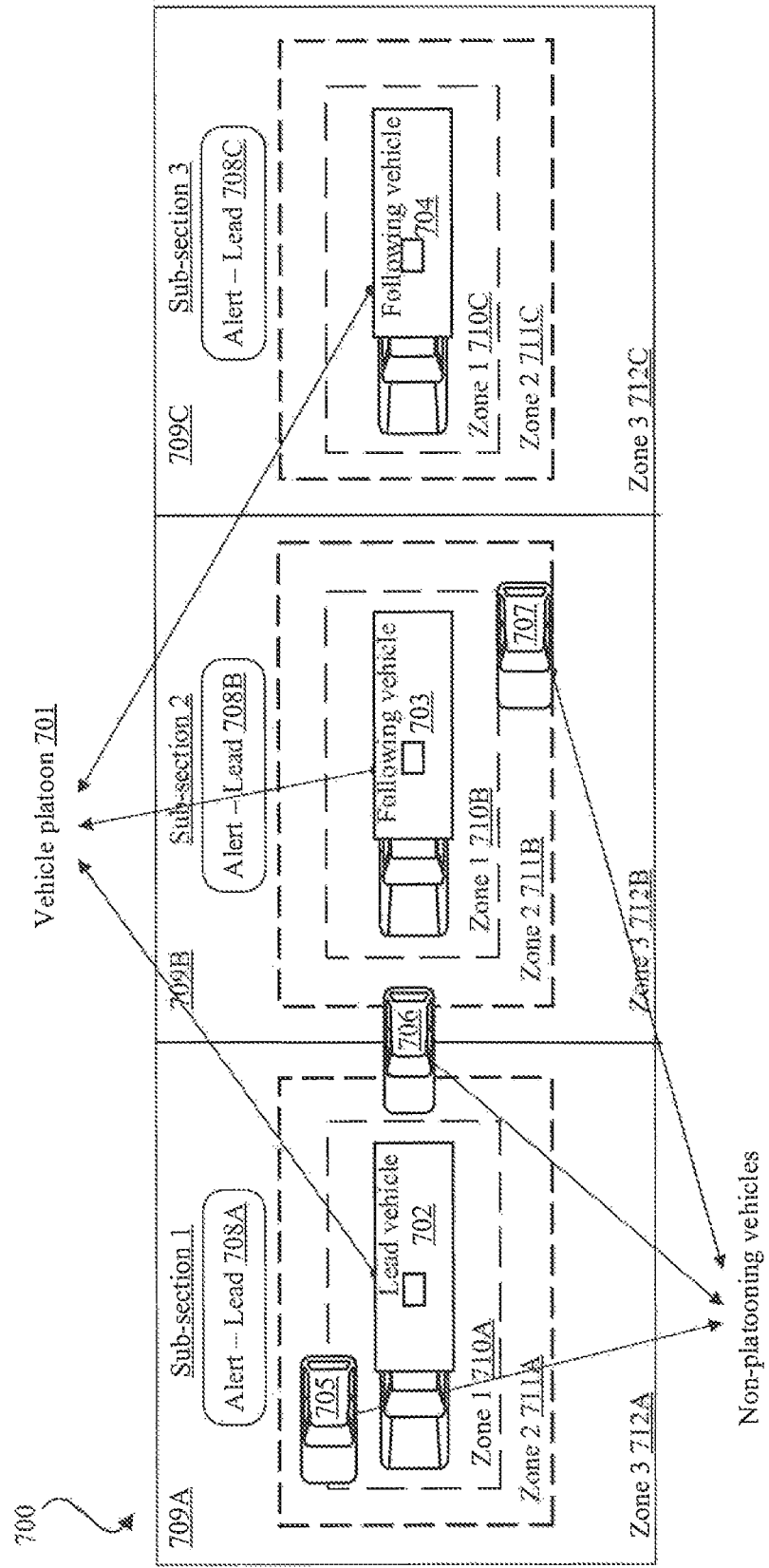
FIG. 7 illustrates a simulated view of a vehicle platoon provided by a surround view generation device of a vehicle, in accordance with embodiments of the present disclosure.

FIG. 7 illustrates a simulated view of a vehicle platoon 701 provided by a surround view generation device of a vehicle, in accordance with embodiments of the present disclosure. As illustrated the embodiment of a vehicle display module 209 provides a simulated view 700 of the vehicle platoon 701. The collision detection module 208 detects one or more non-platooning vehicles as obstacles. The obstacles are highlighted in the simulated view displayed on the vehicle display module. In an embodiment, the obstacles are highlighted based on the collision probability of the one or more obstacles with the current vehicle. In another embodiment, the obstacles are highlighted based on the collision probability of the one or more obstacles with any other vehicle in the vehicle platoon.

As shown in FIG. 7, if the lead vehicle 702 in the vehicle platoon 701 suddenly detects any obstacles in the front or at the sides, for example a non-platooning vehicle 705, the simulated view 709A, 709B, 709C provided on the vehicle display module of each of the vehicles in the vehicle platoon 701 can display an alert such as "ALERT—LEAD". The collision detection module of the lead vehicle 702, either alone or in combination with the alerting module, generates an alert for the vehicle display module of one or more vehicles in the vehicle platoon 701 so that driver in the following vehicles can take independent control of such emergency situation. Further, if the obstacle 706 is entering Zone-1 of any vehicle in the vehicle platoon 701 from behind, the simulated view provided on the vehicle display module of respective vehicle will generate an alert message for predicted collision. In another embodiment, if an obstacle enters Zone-1 from front or sides of any vehicle in the vehicle platoon 701, each of the following vehicles along with such vehicle will be alerted.

In an embodiment, there can be an emergency situation in front of the lead vehicle 702 of the vehicle platoon 701, where the lead vehicle 702 is unable to send the braking signal to one or more following vehicles 703 and 704, In such a case, then collision detection module associated with one or more following vehicles 703 and 704 will provide braking signals to the vehicle to act independently and avoid collision. In such cases, the signals provided by the collision detection module, either alone or in combination with the alerting module, of the surround view generation device can be given priority over regular steering directions and braking signals transmitted from the lead vehicle 702 controlling the vehicle platoon 701.

In another embodiment, if an obstacle enters Zone 2 711A or 711B or 711C of any vehicle in the vehicle platoon 701, the warning message is generated for that particular vehicle. If the inter-vehicular distance between the vehicles in the vehicle platoon decreases and the zones gets merge, the Zone with highest priority (1 being highest) will be retained. The collision probability is evaluated as high if the obstacles are present in the red zone.

In another embodiment, the surround view 700 of the vehicle platoon 701 can also be used by the lead vehicle 702 while changing lanes. The surround view 700 of the vehicle platoon 701 will capture the platooning and non-platooning vehicles. This enables the lead vehicle 702 to have sight of following vehicles 703, 704 as well as nearby non-platooning vehicles 705, 706, 707, thus the lead vehicle 702 can take decision to change the lane whenever required.

In an embodiment, the surround view of the vehicle platoon 100 can also be used by one or more following vehicles in the vehicle platoon to increase or decrease inter-vehicle distance during joining or leaving of vehicle platoon. In an additional embodiment, when an intruding vehicle tries to enter in between the gap of two platooning vehicles, it is required to send a request to the lead vehicle which in turn will inform the one or more following vehicles to create the space for intruding vehicle to accommodate. In such a case, the maximum inter-vehicular distance between two platooning vehicles is also captured using camera systems. In another embodiment, when the intruding vehicle wants to move out, it informs the lead vehicle and the lead vehicle will communicate to one or more following vehicles to accelerate and fill in the gap.

The method further includes enabling the vehicle in the vehicle platoon 100 to perform at least one of dissolving the vehicle platoon, leaving the vehicle platoon, and joining another vehicle platoon based on at least one of the surround view of the vehicle platoon and speed of the vehicle. The method further includes transmitting braking signals by the surround view generation device based on at least one of the surround view of the vehicle platoon and the speed of the vehicle. In an embodiment, the surround view generation device of the vehicle can override the steering directions and braking signals transmitted from the lead vehicle to following vehicles in the vehicle platoon.

Figure 8:
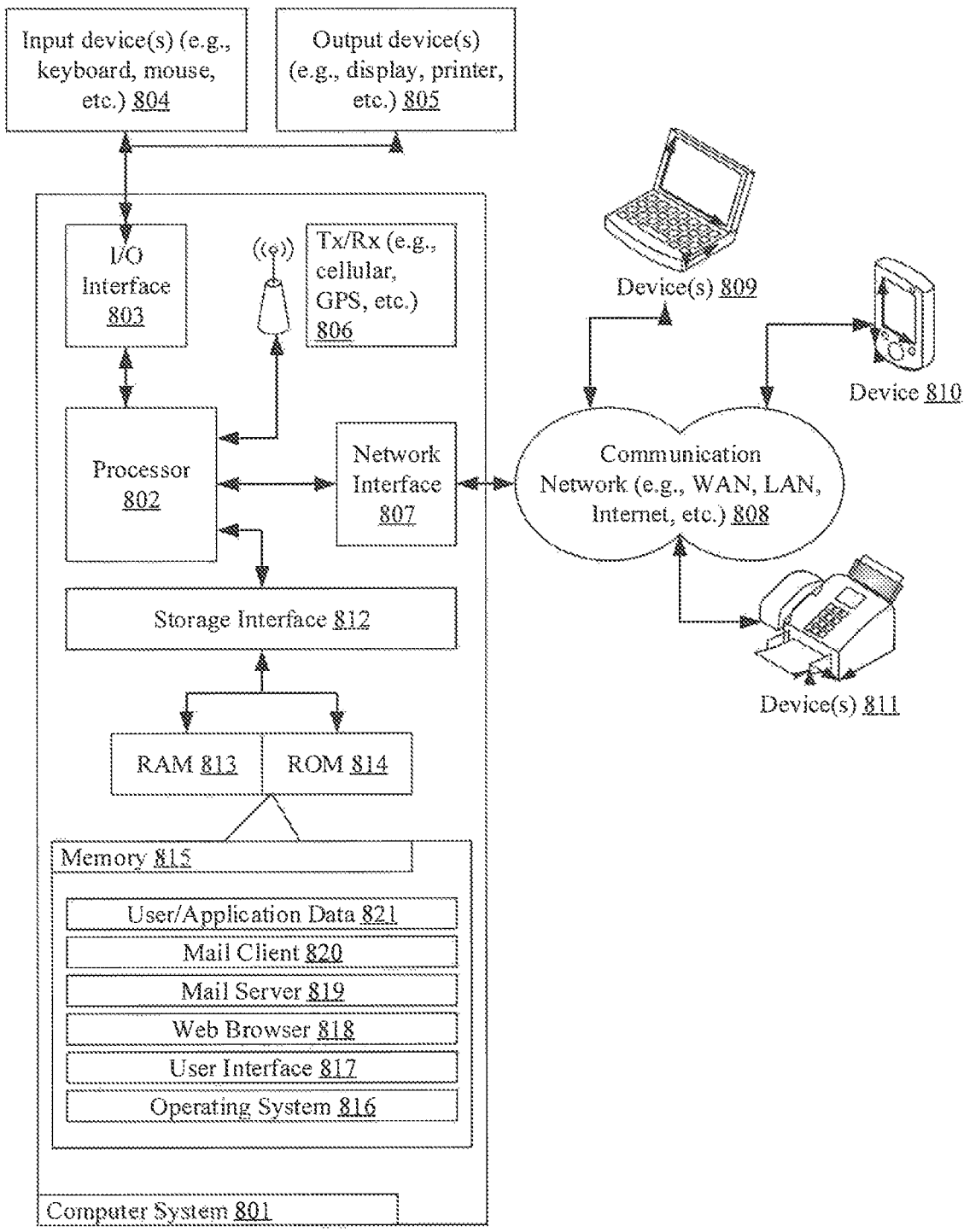
FIG. 8 illustrates a block diagram of an exemplary computer system for implementing embodiments consistent with the present disclosure.

FIG. 8 is a block diagram of an exemplary computer system for implementing embodiments consistent with the present disclosure. Variations of computer system 801 may be used for implementing list all computers from other figures. Computer system 801 may comprise a central processing unit ("CPU" or "processor") 802. Processor 802 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4850IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 810, 811, and 812. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/8/8, etc.), Apple iOS, Google Android, Blackberry OS, or the like. User interface 818 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., list here) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application method of generating a surround view of a vehicle platoon and a device thereof. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating a surround view of a vehicle platoon, the method comprising:
   acquiring, by a surround view generation device associated with a vehicle in the vehicle platoon, a local surround view of the vehicle, wherein the local surround view comprises a front camera view, a rear camera view, a left camera view, and a right camera view;
   receiving, by the surround view generation device, at least one of a truncated local surround view associated with one or more preceding vehicles in the vehicle platoon and a truncated local surround view associated with one or more following vehicles in the vehicle platoon,
      wherein the truncated local surround view associated with the one or more preceding vehicles in the vehicle platoon comprises the front camera view, the left camera view and the right camera view associated with each of the one or more preceding vehicles, and
      wherein the truncated local surround view associated with the one or more following vehicles in the vehicle platoon comprises the rear camera view, the left camera view and the right camera view associated with each of the one or more following vehicles;
   generating, by the surround view generation device, the surround view of the vehicle platoon using the local surround view of the vehicle, the truncated local surround view associated with the one or more preceding vehicles, and the truncated local surround view associated with the one or more following vehicles; and
   navigating, by the surround view generation device, the vehicle based on the surround view of the vehicle platoon.

2. The method as claimed in claim 1, wherein the vehicle is at least one of a lead vehicle and a non-lead vehicle associated with the vehicle platoon.

3. The method as claimed in claim 1, wherein the local surround view is acquired through one or more cameras mounted on the vehicle.

4. The method as claimed in claim 1, wherein the local surround view is acquired through road-based infrastructure.

5. The method as claimed in claim 1 and further comprising:
   acquiring speed data of the vehicle in the vehicle platoon.

6. The method as claimed in claim 1 and further comprising:
   detecting one or more obstacles based on the surround view of the vehicle platoon.

7. The method as claimed in claim 6 and further comprising:
   navigating the vehicle based on the one or more obstacles.

8. The method as claimed in claim 7 wherein navigating the vehicle comprises:
   at least one of dissolving the vehicle platoon, leaving the vehicle platoon, avoiding the one or more obstacles and transmitting braking signals based on at least one of the surround view of the vehicle platoon and speed of the vehicle.

9. The method as claimed in claim 1, wherein generating the surround view of the vehicle platoon comprises stitching the local surround view of the vehicle, the truncated local surround view associated with one or more preceding vehicles and the truncated local surround view associated with one or more following vehicles.

10. A surround view generation device for a vehicle platoon, the surround view generation device comprising:
    a processor; and
    a memory communicatively coupled to the processor, wherein the memory stores processor instructions, which, on execution, causes the processor to:
       acquire a local surround view of a vehicle in the vehicle platoon, wherein the local surround view comprises a front camera view, a rear camera view, a left camera view, and a right camera view;
       receive at least one of a truncated local surround view associated with one or more preceding vehicles in the vehicle platoon and a truncated local surround view associated with one or more following vehicles in the vehicle platoon,
          wherein the truncated local surround view associated with the one or more preceding vehicles in the vehicle platoon comprises the front camera view, the left camera view and the right camera view associated with each of the one or more preceding vehicles, and
          wherein the truncated local surround view associated with the one or more following vehicles comprises the rear camera view, the left camera view and the right camera view associated with each of the one or more following vehicles;
       generate the surround view of the vehicle platoon using the local surround view of the vehicle, the truncated local surround view associated with the one or more preceding vehicles, and the truncated local surround view associated with the one or more following vehicles; and
       navigate the vehicle based on the surround view of the vehicle platoon.

11. The surround view generation device as claimed in claim 10, wherein the vehicle is at least one of a lead vehicle and a non-lead vehicle associated with the vehicle platoon.

12. The surround view generation device as claimed in claim 10, wherein the local surround view is acquired through one or more cameras mounted on the vehicle.

13. The surround view generation device as claimed in claim 10, wherein the local surround view is acquired through road-based infrastructure.

14. The surround view generation device as claimed in claim 10, wherein the processor is configured to acquire speed data of the vehicle in the vehicle platoon.

15. The surround view generation device as claimed in claim 10, wherein the processor is configured to detect one or more obstacles based on the surround view of the platoon.

16. The surround view generation device as claimed in claim 15, wherein the processor is configured to navigate the vehicle based on the obstacles.

17. The surround view generation device as claimed in claim 16, wherein the processor is configured to navigate the vehicle by at least one of dissolving the vehicle platoon, leaving the vehicle platoon, avoiding obstacles and transmitting braking signals based on at least one of the surround view of the platoon and speed of the vehicle.

18. The surround view generation device as claimed in claim 10, wherein the processor is configured to generate the surround view of the platoon by stitching the local surround view of the vehicle, the truncated local surround view associated with one or more preceding vehicles and the truncated local surround view associated with one or more following vehicles.

19. A non-transitory computer readable medium including instructions stored thereon that when processed by at least one processor cause a surround view generation device to perform operations comprising:
  acquiring a local surround view of a vehicle in a vehicle platoon, wherein the local surround view comprises a front camera view, a rear camera view, a left camera view, and a right camera view;
  receiving at least one of a truncated local surround view associated with one or more preceding vehicles in the vehicle platoon and a truncated local surround view associated with one or more following vehicles in the vehicle platoon,
    wherein the truncated local surround view associated with the one or more preceding vehicles in the vehicle platoon comprises the front camera view, the left camera view and the right camera view associated with each of the one or more preceding vehicles, and
    wherein the truncated local surround view associated with the one or more following vehicles in the vehicle platoon comprises the rear camera view, the left camera view and the right camera view associated with each of the one or more following vehicles;
  generating the surround view of the vehicle platoon using the local surround view of the vehicle, the truncated local surround view associated with the one or more preceding vehicles, and the truncated local surround view associated with the one or more following vehicles; and
  navigating the vehicle based on the surround view of the vehicle platoon.

* * * * *